(12) United States Patent
Shiina et al.

(10) Patent No.: US 9,931,770 B2
(45) Date of Patent: Apr. 3, 2018

(54) PROCESS FOR PRODUCING PLASTIC FOAM COMPOSITE

(75) Inventors: Naonori Shiina, Yokohama (JP); Hideo Sekiguchi, Yokohama (JP); Toshio Horie, Yokohama (JP); Akira Kitaichi, Yokohama (JP); Susumu Nakano, Yokohama (JP); Hiroo Miyairi, Yokohama (JP); Hiroko Nakano, legal representative, Yokohama (JP); Shinya Nakano, legal representative, Yokohama (JP)

(73) Assignee: SUMATICS BLADES LIMITED, Hong Kong (HK)

( * ) Notice: Subject to any disclaimer, the term of this patent is extended or adjusted under 35 U.S.C. 154(b) by 1189 days.

(21) Appl. No.: 13/412,600

(22) Filed: Mar. 5, 2012

(65) Prior Publication Data

US 2012/0270044 A1    Oct. 25, 2012

Related U.S. Application Data

(62) Division of application No. 10/575,965, filed as application No. PCT/JP2004/015228 on Oct. 15, 2004, now Pat. No. 8,147,733.

(30) Foreign Application Priority Data

Oct. 17, 2003  (JP) .................................. 2003-389941

(51) Int. Cl.
  *B29C 44/04*    (2006.01)
  *B29C 44/44*    (2006.01)

(52) U.S. Cl.
  CPC ............ *B29C 44/04* (2013.01); *B29C 44/445* (2013.01); *Y10T 428/1376* (2015.01); *Y10T 428/249953* (2015.04); *Y10T 428/2924* (2015.01)

(58) Field of Classification Search
  None
  See application file for complete search history.

(56) References Cited

U.S. PATENT DOCUMENTS 3,814,778 A * 6/1974 Hosoda et al. ............... 264/45.4
3,914,361 A * 10/1975 Shiina et al. ................. 264/45.4
(Continued)

FOREIGN PATENT DOCUMENTS

GB    1353041 A       5/1974
JP    2000000908 A *  1/2000

OTHER PUBLICATIONS

Shiina et al., Plastic Foamed Composite, Jan. 7, 2000, machine translation of JP2000-000908A.*

(Continued)

*Primary Examiner* — Chinessa T Golden
(74) *Attorney, Agent, or Firm* — Polsinelli PC; Andrew Z. Weaver

(57) ABSTRACT

A foam composite with a skin formed in one shot by charging plastic powders or minute particles together with polyolefin pellets that can be cross-linked and foamed in a mold, and heating the mold while rotating. The composite absorbs almost no moisture, having satisfactory strength, being excellent as an insulating material.

Further, providing a covering of a non-foaming or a slightly foaming material to the pellet of polyolefin that can be cross-linked and foamed, and conducting the forming, foamed granules as a core, and a covering of a reinforcing member for the core.

4 Claims, 8 Drawing Sheets

(56) References Cited

U.S. PATENT DOCUMENTS 4,713,271 A * 12/1987 Searl .................. B29C 44/3442
138/103
5,000,891 A 3/1991 Green

OTHER PUBLICATIONS

European Office Action dated Oct. 10, 2012 in corresponding European application No. 04 792 445.1-1253.

* cited by examiner

US 9,931,770 B2

PROCESS FOR PRODUCING PLASTIC FOAM COMPOSITE

This application is a divisional application of U.S. application Ser. No. 10/575,965, which was filed Apr. 14, 2006, a national stage of International application No. PCT/JP04/15228, filed on Oct. 15, 2004, which claims priority to Japanese application No. JP2003-389941. The entire disclosure of each of the referenced applications is herewith incorporated by reference.

TECHNICAL FIELD

Plastic foam is composed of extremely small bubbles and surrounding thin films, in which the volume fraction of gases is large and the convection is little, therefore the plastic foam has an excellent insulation, cushioning and flotation properties, and is cheap, consequently being utilized in a large quantity in many fields. The foam has these features, on the other hand, the foam has defects such as low strength, causing the independent application to be difficult, moisture absorption, being derived from the thin films of the foam, which causes deterioration in the insulation properties to develop, and creep to occur even under low pressure, shrinkage with the lapse of time, being derived from the stretched films of the foam, and low weather resistance. An object of the present invention is to develop a process for producing such a material that the defects of the plastic foam are improved by providing a plastic skin with an even thickness on the whole surface of a plastic foamed body, and by adhesion and integration of the skin to the foamed body.

The present invention relates to a process for producing a plastic foam composite. Particularly the present invention relates to a process for producing a plastic foam composite, that can suitably be utilized to insulation materials, construction materials, cushioning materials, shock absorption materials, flotation materials, corrosion resistant means, and the like.

BACKGROUND ART

One technique for providing a plastic skin on the surface of a plastic foamed body is a process of forming a skin by rotational molding, subsequently pouring and foaming polyurethane in the skin. By this process, however, the skin and the core do not adhere together, resulting the flexural strength and the impact strength to be not satisfactory. Further, the processing temperature of a product is low, and then strain exists in the shaped body, causing the deformation with time, furthermore, the product is composed of two different materials, and then recycling is difficult. In addition, the process consists of two steps, which causes an increase in the cost, and such means that foaming of the skin or providing reinforcing members in the core is difficult. Another technique is a process consisting of forming a skin by blow molding, filling in it with foam particles, and heating them. In this technique, it is difficult to conduct the heating at high temperatures, consequently, voids tend to develop between core particles. In addition, molding is conducted at low temperatures, causing the adhesion between the skin and the core to be unsatisfactory, strain to remain in the shaped body, and resulting the flexural strength and the impact strength to be low, deformation to occur with time, furthermore, such means that foaming of the skin or providing reinforcing members in the core are difficult, and a large size shaped body cannot be produced.

A technique for producing a composite consisting of a skin and a foamed body, by charging plastic powders and pellets that can be cross-linked and foamed in a mold, subsequently by conducting rotational molding, was invented by one of the inventors of the present invention approximately 30 years ago (U.S. Pat. No. 3,814,778 and U.S. Pat. No. 3,914,361). According to this technique, a skin and a core are formed in a same step, allowing the skin to be excellently adhered to the core, consequently, the flexural strength and the impact strength of the shaped body to be improved. However, it is difficult to produce a shaped body with a skin of an even thickness and a highly foamed core, and with almost no void in a stable condition, which results that this technique has not been practically applied up to now.

DISCLOSURE OF THE INVENTION

The present invention contributes to the development of a process for producing an insulation material of a foam composite with a low-density and integrated core, and with a skin that is strongly adhered to the core, which has excellent insulating properties, suffering almost no deterioration by moisture absorption, having a long life, offering low energy-consumption through the all period of use, and contributes to the prevention of global warming. Further, a foam composite having a core with reinforced members, produced by a process of the present invention, is light weight with one fourth specific gravity of wood and rigid with an equal strength to wood, consequently favorable as a light-weight cheap construction material and the like, a cushioning material or an impact absorbing material that will not break when subjected to impact, and a flotation material. Furthermore, the present invention contributes to global environmental preservation, by utilizing recycled plastic or rubber-plastic waste as a material, and producing wood substitutes.

The present invention 1 is a process for producing a sandwich-structure body, wherein a mold is charged with plastic powders or minute particles, and larger polyolefin pellets to which a cross-linking agent and a foaming agent has been compounded, and the mold is heated from outside while being rotated, forming a skin with an even thickness by melting the plastic powders while cross-linking the polyolefin and providing elastic modulus within a range from 1.6 to $3.0 \times 10^4$ Pa to the polyolefin, permitting the pellets to adhere to the skin and the foaming agent to decompose, which results that an integrated core with homogeneous and fine bubbles and with almost no boundary which separates low density pellets is formed, and that the core adheres to the skin. Further, an insulation material that absorbs almost no moisture can be obtained with this shaped body.

The present invention 2 is a process for producing a foam composite having a skin with an even thickness and a core that is composed of a low-density foamed body with reinforcing members, wherein polyolefin pellets (i.e. double-layered foaming pellets), that can be cross-linked and foamed and having a plastic covering in a portion or the whole of the pellet, are made, and a mold is charged with the pellets together with plastic powders, and rotational molding is conducted. When the pellets covered entirely are used, a foam composite having a skin with an even thickness and a plurality of granular foamed bodies surrounded with reinforcing members of an approximately even thickness, can be produced. Moreover, when the pellets covered in a portion are used, a foam composite with a skin in which foamed bodies and belt-, string-shaped, or solid reinforcing members are intermingled, can be produced.

As a structural body, a sandwich body of plastic has not been used to the present time, because of the low strength of the core. However, the shaped body with reinforcing members, produced according to a process of the present invention, has the thickness of reinforcing members from 0.05 to 0.5 mm, much thicker than the film thickness approximately 0.01 mm of bubbles in a foamed body, which allows an improvement in the compression strength, the flexural strength, the impact strength, and the shock absorbing properties by the reinforcement effect thereof. The reinforcing members have structure with no specific orientation, unlike the tree with annual rings. Up to the present time, utilizing plastic, a lightweight shaped body or a shaped body having strength has been produced, however, a lightweight shaped body with strength has not been produced. At the first time, by this technique, the production of a lightweight, nevertheless, strong shaped body is becoming possible.

The above-mentioned double-layered pellet has an excellent processing property, and a foam composite produced with the material has almost no void. Further, it is because the material for reinforcing members is more moving in a mold than bubbles.

BEST MODE FOR CARRYING OUT THE INVENTION

Figure 1:
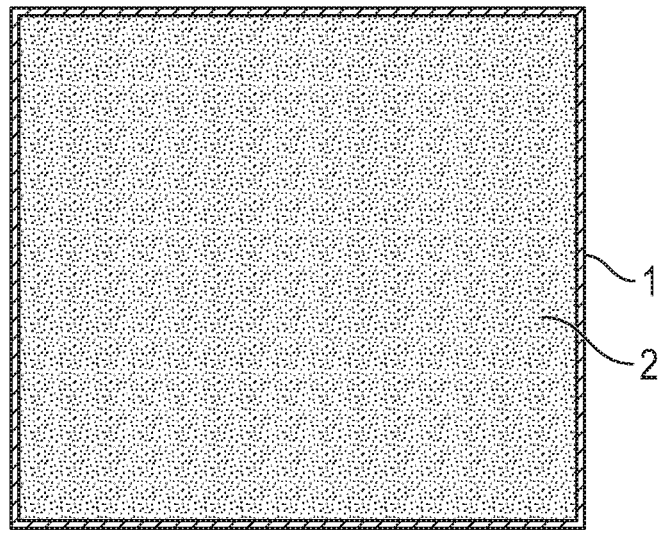
FIG. 1 illustrates an example of a shaped body comprising a skin and a foamed-body core. In the figure, 1 is a skin and 2 a foamed body of high degree expansion.

For example, a nearly cubic pellet with a side of 4 mm in length, which can be cross-linked and foamed, can generally be used in a process of the present invention. The size is 40 times as large as the diameter approximately 0.1 mm of plastic powders, while the volume or the weight thereof is that to the third power, 64000 times. Therefore, when the two materials are charged in a mold and rotational molding is conducted, the plastic powders melt first forming a skin, and then the pellets adhere to the skin, subsequently the plastic powders and the pellets decompose, and when it rises to approximately 140° C., polyolefin is cross-linked resulting in the storage elastic modulus to be increased, further a foaming agent decomposes when it rises to approximately 190° C. The difference between a cross-linking agent and the foaming agent in a temperature to start decomposition is as much as 30° C., which suggests that the foaming occurs after the cross-linking is finished, however, the cross-linking agent is in an extremely small quantity being dispersed in polymer, which causes the decomposition of the foaming agent to start before the cross-linking is finished, consequently both reactions proceed simultaneously.

When a cross-linking agent of 1 PHR (i.e. per hundred resin) and a foaming agent of 15 PHR, for example, are added to polyolefin, and thus obtained compound is molded and foamed in the air, it expands in a similar figure to the degree of 30 times. This is a normal process for the production of cross-linked polyethylene foam. When a compound of polyethylene mixed with a small quantity of a cross-linking agent of 0.3 PHR and a foaming agent of 15 PHR, for example, is molded and foaming is conducted, the compound expands to 33-fold and a body is obtained in a collapsed shape. In the present invention, it is preferable to form a core with a low-density foamed body and granular materials being integrated, therefore, a granular material added with a small quantity of cross-linking agent is utilized.

In a process of the present invention, cross-linking proceeds in parallel with foaming, as a result, a foamed body thus obtained has decreased storage elastic modulus, decreased gel-fraction, permitting a core with greater flow properties to be formed.

In a process of the present invention 1, a small quantity of cross-linking agent is used to cross-link polyolefin lightly so that the storage elastic modulus to be adjusted within a range from 1.6 to $3.0 \times 10^4$ Pa, rubber-like elasticity developed, and gases confined inside, permitting a core with homogeneous and fine bubbles, and with almost no boundary which separates low-density granules, to be formed. In addition, the storage modulus specified in the present invention is obtained by the measurement of dynamic elasticity at 190° C. and 100 Hz, wherein polyolefin and a cross-linking agent of a prescribed ratio are blended, shaped in a sheet using a press, cross-linked, and then a test specimen is obtained, to which a shear strain is applied with a dynamic elasticity measuring apparatus. In the present invention, a foam composite is formed using a polyolefin pellet, that shows storage elastic modulus within a range from 1.6 to $3.0 \times 10^4$ Pa, at 190° C. and 100 Hz.

Figure 2:
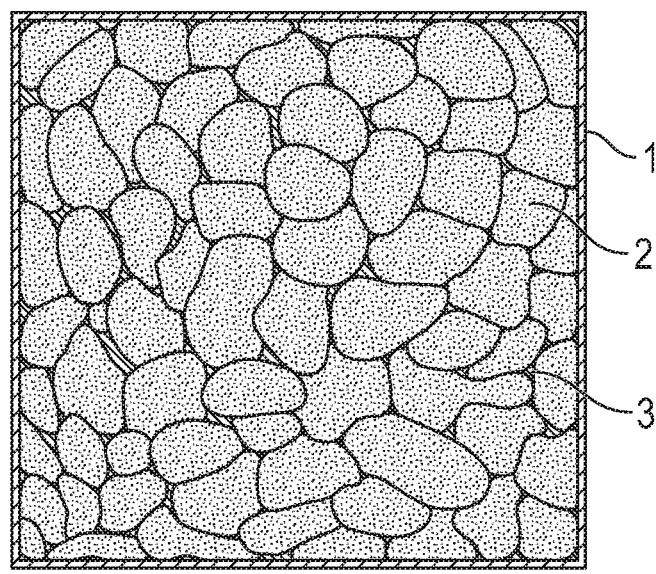
FIG. 2 illustrates an example of a shaped body comprising a skin and a foamed-body core with reinforced members. In the figure, 1 is a skin, 2 a foamed body of high degree expansion, and 3 reinforced members.

In a process of the present invention 2, a rod is made with polyolefin that can be cross-linked and foamed, covered with plastic, and a pellet provided with a plastic covering with approximately even thickness, on the surface in part or in whole of the material that can be foamed, is made. When a mold is charged with the pellet, together with plastic powders, and rotational molding is conducted, as shown in FIG. 2, foamed granules of the size from 5 to 25 mm in diameter and the expansion from 20-fold to 70-fold, having reinforcing members with a thickness from 0.05 to 0.5 mm, in a word, foamed bodies with the density from 0.1 to 0.01 g/cm$^3$, are joined together and integrated to form a core. The skin thickness of thus formed shaped body is preferably controlled within a range from 1 to 10 mm, more preferably from 2 to 7 mm, while granules with reinforcing members existing almost everywhere evenly in the core, being wholly linked and filling the inside of the core, and the reinforcing members on the surface of a sphere having a curved shape with elasticity and being strained, and reinforcing film sections vertical to all directions existing which disperses the force produced by an impact quickly in everywhere of a shaped body, which permits a shaped body which, although deforms, is almost unbreakable, to be formed. Further, the core granules are adhered to the skin, enabling the compression strength, the flexural strength, and the impact strength to be remarkably high. The present invention is, moreover, a process for producing a shaped body by rotational molding, wherein plastic is processed at a normal processing temperature, foamed bodies of excellent flow properties are utilized for the core, the heating and the cooling are practiced slowly under pressure, permitting a shaped body with almost no strain and no changes in shape during the passing time to be formed. Thus obtained foam composite is endowed with all characteristics that the foam possesses, being stable, readily produced at a cheap cost, a flawless and ideal shaped body. Therefore the application is wide to all plastic products and in large quantities.

Further, the polyolefin pellet that can be cross-linked and foamed, used in the present invention, is produced by extruding polyolefin that can be cross-linked and foamed into a rod with the size of 2 to 10 mm in diameter, providing a 0.5 to 5 mm thick plastic covering on the surface of the rod, compressing and cutting the rod with the covering in a molten state with a cutter having an end of an acute angle enabling both ends of the plastic to be joined in a manner that the joined section being 0.3 mm or greater, more preferably, within a range from 0.3 to 3.0 mm, in thickness.

When a skin is provided in a portion of pellets that can be foamed, and rotational molding is conducted with the pellets together with plastic powders, a foam composite with a skin with an even thickness, a low-density foamed-body core, and belt- or string-shaped, or solid reinforcing members, which are being intermingled, can be obtained. When intensive compression is applied, the shaped body thus obtained could yield, meaning the shaped body being provided with excellent impact absorbing properties.

As a material used for covering a portion or the whole of a compound that can be foamed, low-density polyethylene, high-density polyethylene, polypropylene, EVA, and nylon can be independently, or in a mixture, utilized. High-density polyethylene has excellent mechanical properties, consequently a large reinforcing effect. Further, the material used for covering a portion or the whole of the compound that can be foamed, may contain a foaming agent within a range from 0.1 to 10 PHR.

In the present invention, as a material used to form a skin, plastic powders or minute particles, having a diameter from 0.1 to 2 mm, are used. As the plastic, thermoplastic resins having a melting point or a softening temperature of 170° C. or below, or semi-cured thermosetting resins can be used. As the thermoplastic resin, polyolefin, ethylene-vinyl acetate copolymer, polyamide resins, and polyester resins can be used, and polyolefin is preferable because of its low moisture absorption, however, the selection may be made according to the properties of a skin required. In addition, high-density polyethylene, polypropylene, and nylon may be used. An epoxy resin, a phenol resin, or a polyester resin and the like can be used as a semi-cured thermosetting resin, by mixing a hardener and make the resin to melt and be semi-cured, subsequently powders or minute particles thereof can be formed and applicable.

The quantity of plastic powders for a skin is preferably controlled so that a skin with thickness of 1 mm or greater and 10 mm or less is formed. When the skin formed is thinner than 1 mm, moisture absorption occurs. When the skin is thicker than 10 mm, heat escapes readily through the skin, and, further, breakdown occurs readily by an impact.

In the present invention, the skin with an even thickness means that a skin has as the minimum thickness, a thickness of preferably one half or more of the average skin thickness. And, the average thickness of the skin may be decided by measuring the skin thickness of shaped body at arbitrary ten points.

By this technique, even the skin can be foamed, which enables that a shaped body of lightweight, strong against impact, and excellent in insulation properties, can be formed.

In a foamed body of polyhedron bubbles, thin sections are liable to be formed in the film of the bubble, that cause moisture absorption, however, the polyhedron structure is superior in elasticity, therefore the structure has been adopted for the skin of cushioning materials. By foaming the skin, mutually intricate structure of the skin and the core is formed, the joint section being not even, enabling excellent adhesion.

In this technique, the foaming of a skin can be conducted only by mixing a foaming agent with plastic powders, and the degree of expansion can be controlled unrestrictedly. Further, by combined use of plastic powders with minute particles of approximately 1 mm in diameter, to which a foaming agent has been kneaded, a foamed skin can be formed inside of a non-foamed thin skin. Furthermore, cross-linking of a skin can be conducted, for example, by simply mixing a cross-linking agent with plastic powders, and a thin skin with an even thickness is formed.

Further, inventors of the present invention did research on a method of producing a foam composite provided with a skin with an even thickness and a highly foamed core, and found that the use of plastic powders having a storage elastic modulus, that is measured at 190° C. and at the angular velocity of 1 radian/second, of $1 \times 10^3$ Pa or greater, is preferable, and a skin with an even thickness can be obtained.

When powders or minute particles of a resin that can be cross-linked by organic peroxide are used as a skin material, the material produced by adding powdery organic peroxide with a quantity from 0.2 to 2.0 PHR to powders or minute particles of the resin, mixing them at the temperature above the melting point of the organic peroxide in a manner that the peroxide is coated on the surface of the powders or minute particles, can be used. By the above-mentioned process, powders or minute particles are heated, adhered to and melted on the inner surface of the mold, while cross-linking reaction proceeds allowing the quality of the skin infusible, consequently, even a material having a storage elastic modulus of $1 \times 10^3$ Pa or less can be used. The above-mentioned process is particularly effective with polyethylene, as well as polyolefin, and EVA copolymer, permitting the inner surface of the skin to be smooth, consequently the thickness of the skin to be reduced. Further, by the mixed use of the above mentioned peroxide-added resin powders with other thermoplastic resin powders, the flowing-out of a skin material outside of the mold can be suppressed, and a characteristic skin can be obtained.

In a process of the present invention, an improvement in the strength or flame retardation of a skin can be made by adding to the skin a flame retardant resin, an inorganic filler, a flame retardant, fiber or the like. Further, the generation of static electricity can be suppressed by adding carbon black, stainless steel fiber or the like, while weather resistance can be increased by adding an ultraviolet light absorbing agent or an antioxidant. In addition, a fungicide, an antibacterial, a pigment and the like can be added. Roofing material, for example, can be obtained by embossing the skin, or by covering the skin with an aluminum sheet or inorganic particles, making the skin flame retardant. An excellent insulating material can be obtained by affixing aluminum foil to a foam composite and blocking moisture, in addition, the insulation properties thereof can be improved by affixing foamed plastic sheets.

The polyolefin material that can be preferably used for a core is LDPE with a melt property MFR within a range from 1.5 to 20 g/10 min.

Cross-linking agents that can be used in the present invention are peroxides such as dicumyl peroxide, 2,5-dimethyl-2,5bis-(t-butylperoxi)hexane, di-t-butyl peroxide and the like. The quantity of a cross-linking agent mixed with polyolefin is within a range from 0.2 PHR to 0.6 PHR, and preferably from 0.25 PHR to 0.5 PHR. If the quantity of the mixed cross-linking agent is too low, gases escape, bubbles become coarse, and the core could not fill up the inside of the skin. If the quantity is too large, the expansion is suppressed, consequently voids are likely to develop in the corner sections of the mold, making irregularities on the skin. By using, as a portion of cross-linking agent, a cross-linking co-agent having two or more reactive double bonds within the molecule, such as 1,2-polybutadiene triallylcyanurate, trimethylolpropane trimethacrylate and the like, the quantity of the cross-linking agent can be reduced and homogeneous cross-linking can be achieved.

A pellet preferably used in the present invention is that of polyethylene, polypropylene, ethylene-vinyl acetate copolymer or the like, to which a cross-linking agent and a foaming agent have been mixed, namely, polyolefin that can be modified to have a three dimensional structure. Pellets with the size of approximately 2 mm in diameter are likely to adhere to the whole surface of a mold during rotational molding, and expand in the thickness direction during foaming, permitting the formation of a void-less core. When large pellets with a particle size of 5 mm or greater are used, the escape of gases can be suppressed, and the formation of a skin with an even thickness will be promoted. Further, it can prevent the pellets from getting into a skin at edge sections of the mold, which could deteriorate the external appearance. The shape of pellets may be a sphere, a sphere-like ellipsoid, a rod having the length approximately equal to the rod diameter, a cube and the like, and preferably of a shape that enables moving of the pellets inside the mold.

A foaming agent for use in the present invention is a decomposition-heat generation type foaming agent, and azodicarbonamide, dinitrosopentamethylenetetramine, and a mixture thereof are suitable examples. When polyolefin becomes three dimensional by cross-linking, rubber-like elasticity is generated in the molten state thereof, which can suppress the gathering together and dispersion of gases generated from decomposed foaming agents, consequently a low density foamed body having evenly fine bubbles can be obtained. The quantity of the foaming agent mixed into the polyolefin is typically within a range from 1 PHR to 40 PHR, and preferably from 5 PHR to 30 PHR. If the quantity of the foaming agent is less, then a sufficiently expanded core cannot obtained, while if the quantity is too large, the quantity of voids within the shaped body tends to increase. A foaming co-agent such as zinc stearate, zinc oxide and urea can be used together with a foaming agent. For example, if a foaming agent with a decomposition temperature of 200° C. and a foaming co-agent are mixed with a polyolefin containing a cross-linking agent, the decomposition temperature of the foaming agent is lowered to a temperature range from 170 to 190° C., therefore, it is ensured that the decomposition of the foaming agent commences before the completion of the decomposition of the cross-linking agent. A nucleating agent can be used with a foaming agent, and reduction in the size of foam bubbles can also be achieved. Mixing of polyolefin with a cross-linking agent and a foaming agent and the like can be performed using a mixing apparatus such as a typical kneader, a Banbury mixer or the like, and the mixing can be conducted at a temperature which ensures that the cross-linking agent does not decompose. Following mixing, the mixture is either formed into a sheet using a roll and then cut into pellets, or extruded from an extruder in a rod and then cut into pellets. If a mixing apparatus such as a biaxial extruder is used, which is capable of imparting a large shearing force to the material, then the foaming agent is well dispersed, enabling effective utilization of the decomposition gas. There can be also a method for producing a pellet that can be foamed, such that a compound with a quantity of cross-linking agent and also a foaming agent is produced using a kneader, subsequently the compound is diluted in an extruder.

If the whole of the polyolefin pellets, used as a material of the foamed core in the present invention, is covered with a non-foaming or slightly-foaming material, and rotational molding is conducted with it together with plastic powders, each pellet with a skin can exist independently, as shown in FIG. 2, adhere mutually and also to the skin of a shaped body, and an integrated reinforcing body can be formed. Thus obtained shaped body has no specific directional property, being provided with tenacity, excellent in mechanical properties, and when subjected to an impact, making it to disperse quickly to the whole body.

Figure 4:
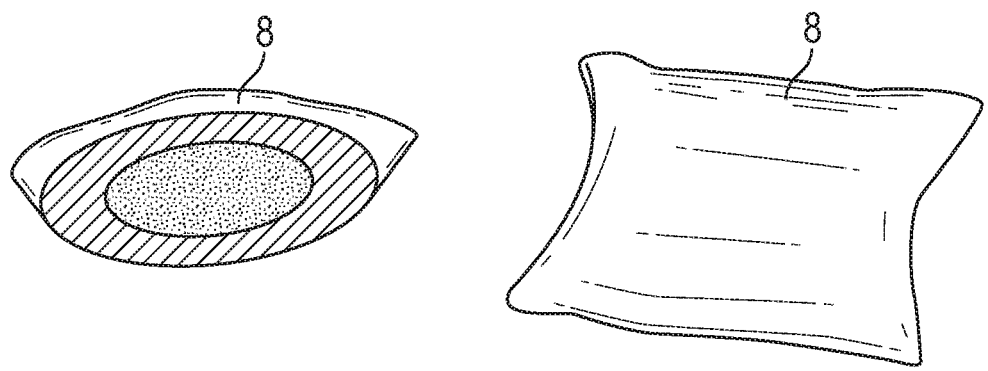
FIG. 4 illustrates an example of a double-layered pellet having a plastic covering on a material that can be foamed. The double-layered pellet is shown as 8 in the figure.

A double-layered foaming pellet can be made by a process, wherein a material that can be cross-linked and foamed is extruded into a rod, and the rod is covered with a sheath which becomes a reinforcing member using a crosshead die, and compressed and cut into an approximately even thickness using a compressing device having a sharp end, and in the molten state thereof. Thus obtained double-layered pellet has, as shown in FIG. 4, a foaming compound layer that is fully covered with a resin, and by adjusting the minimum thickness of the joined section to be 0.3 mm or greater, the disconnection of reinforcing members is prevented even at the time of foaming, which enables that the shaped body has excellent insulating properties and is lightweight, strong, and that the gases are efficiently utilized. Further, by injection molding, this foaming pellet with a cover in all surface, can be also produced.

Equipment for manufacturing a double-layered foaming pellet that is preferably used in the present invention comprises extruders of a cross head, wherein one extruder is able to extrude a mixture of polyolefin with a cross-linking agent and a foaming agent into a rod with the size from 2 to 10 mm, and another extruder is able to provide a plastic covering with thickness from 0.5 to 5 mm on the rod, and enables thus obtained double-layered rod to be cut in a molten state so that the covering being bonded and the thickness at the section being within a range from 0.3 mm to 5 mm, and the cutting thereof within a range from 3 to 15 mm in length being possible.

Further, the double-layered foaming pellet preferably used in the present invention comprises a pellet of polyolefin mixed with a cross-linking agent and a foaming agent, having a size from 8 to 1000 mm$^3$, and a plastic covering with an even thickness from 0.5 to 5 mm on the pellet, wherein the covering is bonded in both ends and has a thickness of 0.3 mm or greater, permitting all surface of the double-layered foaming pellet being covered and the shape thereof being rectangular when the pellet is seen toward the direction of the compression, while being bulged in the center and flat in the end section when the pellet is seen from the side.

As for the above-mentioned pellet covered with a reinforcing member, it is preferable to control the diameter, the thickness, and the ratio of the foaming material to the reinforcing material, to be within a range from 5 to 25 mm, 0.05 to 0.5 mm, and 1 versus 1 to 1 versus 10, respectively. By controlling the thickness of the reinforcing member to be in the middle of the skin thickness (e.g. 3 mm) and the film thickness of the foam (e.g. 0.01 mm), a shaped body with balanced properties of mechanical strength with elasticity can be obtained. The structure of the foam composite, provided with reinforcing members to fulfill both requirements of light weight and strength, is ideal as a structure of lightweight and strong material, moreover, various means can be utilized for providing various properties to the shaped body, such as to foam the reinforcing member, to provide foamed particles with a covering being vertically long in the thickness direction, or to provide the reinforcing member being perpendicular to the skin.

Utilizing the double-layered pellet, the escape of gases at the foaming and shrinkage at the cooling can be suppressed, therefore, by using a large quantity of a foaming agent for the inner-layer polyolefin, and by accelerating the expansion (i.e. exothermic reaction) in the forming step, a high expansion foaming up to 70-fold can be attained with the foamed body with reinforcing members, in contrast, 40-fold expansion has been the limit with normal cross-linked and foamed polyolefin. The covering of the pellet can be foamed by adding a cross-linking agent and a foaming agent and conducting the foaming, resulting the increase in the thickness of reinforcing members, which permits improvement in strength, and also in lightweight and heat insulation properties. A shaped body can also be formed by simply charging the pellet in a mold, and conducting heating and foaming without rotation.

Utilizing the above-mentioned material, a shaped body having an apparent specific gravity of 0.2, 0.3, or 0.4 can be produced, and the strength thereof varies in accordance with the specific gravity, which enables the application to all products made of wood, plastic, or rubber such that people feel too heavy.

In the present invention, a sheet or a casting of metal material, having excellent thermal conductivity such as iron, stainless steel, aluminum can be used for a mold, and the mold is typically either a two-piece mold or the structure comprising sidewalls, an upper lid, and a lower lid. Usually rotational molding molds are produced from sheet metal and typically with a thickness from 2 to 3 mm. However, a thin mold cannot be used in the present invention, to which the pressure of foaming gases is applied, and a mold that is capable to withstand the internal pressure of 3.0 kgf/cm$^2$ can be preferably used. This is, for example, a mold of 5 mm thick iron plate or a material of excellent thermal conductivity having equivalent or superior strength, and ribs are attached if it is necessary for protecting the mold from deformation, and making the temperature thereof to be uniform. A mold is, preferably, provided with r. at the corner sections and a gradient of $2/100$ or greater, and a mold-releasing agent is used. For production of an insulated container provided with a double wall, the mold which can be used is such that has a collar being protruded in the upper section of the inner box, which enables the outer box to be connected with it, and has different sheets being used for the bottom and the side of the outer box, making the charge of material, and also the discharge of a shaped body, to be easy. When the temperature of the inner box does not rise readily, and the skin tends to be thin, the heating of the inner box is to be intensified.

In the present invention, a small vent of diameter from 3 to 10 mm is preferably made in a mold, wherein a thermally insulated Teflon™ tube is fixed, by which an air in the mold can be released at the time of foaming. In that occasion, one end of the tube is placed outside of the mold, and another end near by the center position inside of the mold. Typically a single vent is sufficient for a mold, however, it is preferable to provide 2 or more vents for a mold having a wide area or a complicated shape. When a mold without any vent is used and rotational molding is conducted, voids are liable to generate in a core. The vent for releasing air, which remains in a skin after molding, can be repaired with same material as that of the skin.

In the present invention, rotation of the mold can be performed using a double axis rotation, swing rotation, and the like, wherein the rotational speed is typically controlled within a range from 1 to 20 rpm, so that centrifugal force will not be produced to material in the mold. Rotation of the mold is preferably performed to the forward direction and backward direction alternatively. The quantity of material to be charged in a mold is preferably controlled as 85% or under of the inside volume, allowing the material to be mobile during rotation.

In the present invention, the heating of a mold can be conducted by hot air or direct flame, or by oil utilizing a pipe-welded mold, permitting the mold surface temperature rising to the decomposition temperature of the foaming agent being in use. When the temperature of the mold reaches the decomposition temperature, foaming occurs. By the combined, use of a foaming co-agent, the decomposition temperature of the foaming agent can be adjusted within a range from 170 to 190° C., permitting the time of decomposition from beginning to end being prolonged, a shaped body with almost no void to be produced. The time required for heating is typically from 15 to 30 min.

In the present invention, a mold can be cooled after the heating either by immersion in water or by a shower, and then a shaped body is removed. The skin is quickly quenched and solidified, while melted foamed-core in the center remains at high temperature and solidifies gradually, under the pressure of decomposition gases, consequently, a shaped body being free from strain, having a figure in accordance with the mold, and having high strength, a small shrinkage and dimensional stability, can be obtained. The time for cooling is typically within a range from 15 to 30 min.

In the present invention, the inner pressure of a mold at forming is preferably controlled within a range from 1.5 to 3.0 kg/cm$^2$. The preferable pressure varies according to the size of the shaped body; when a large mold is used the pressure thereof becomes higher. At the beginning of heating, air releases to the outside through the joining section, however, when the foaming agent decomposes, it becomes airtight by the formation of a skin, which allows polyolefin pellets filling to all the corners of the mold, and consequently a foam composite with no void can be obtained.

In the present invention, if a portion of the material is spent to form a burr, the generation of voids can be prevented. When a burr is protruded in quantity, a drop of the pressure in a mold and thinning of the skin will be caused, therefore, the joining section of a mold is preferably controlled so that a burr is formed in the quantity from 0.01 to 1% of the material used, which enables a shaped body with few voids to be obtained and the deformation of the mold to be suppressed.

By this technique, a composite having a greatly foamed core of 30-fold expansion, for example, and a thick skin of not less than 2 mm, preferably not less than 3 mm, can be made, and the foam composite with such a greatly foamed core and a thick skin has superior heat insulating properties and good resistance to moisture absorption, enabling the application thereof in high humidity locations or in water, with expectations that the application in water has a superior energy conservation effect than that of an ordinary insulating material. By foaming a skin to the degree of expansion from 2-fold to 3-fold, which is within a range of spherical foam, the heat insulating properties can be improved without any rise of moisture absorption. Utilizing the technique mentioned-above, a foam composite with favorable heat insulating properties can be obtained by controlling a core to be a foamed body with evenly fine bubbles and with specific gravity of 0.1 or lower, and the maximum dimension of voids in the cross-sectional area thereof, generating in a shaped body, to be not more than 100 mm$^2$. Furthermore, by forming a shaped body with no remaining strain and by adding carbon black, an ultraviolet absorber, and an antioxidant to the skin, the lifespan of the shaped body in outdoors can be lengthened, in addition, an excellent insulating properties can be obtained, enabling an extremely large effect on the energy conservation over long period of the utilization thereof. Heat insulating materials typically used for the insulated vessel in a heat storage air conditioning system or for a heat insulated pool, both of which utilize nighttime surplus electric power, are in contact with water all the time, and are exposed to a highly humid environment, therefore, a product of this technique will prove itself to be a proper example of practical uses with the maximum effect. By laminating a foamed plastic sheet or aluminum foil to the surface of a foam composite, such an effect as improvement in the heat insulating properties and prevention of the moisture absorption can also be achieved.

In the present invention, the core of the foam composite is a cross-linked and foamed body of polyolefin, and, although the compression strength is not so high, joining the core with a reinforcing member can be conducted for improving in the strength. Therefore, a chair, bed and the like produced from thus obtained shaped body, having apparent specific gravity lower than wood, can be favorably used by old or physically handicapped persons.

In the present invention, there are no particular restrictions on the thickness of the core, although the usual thickness is within a range from 10 to 100 mm. If the thickness is less than 10 mm, the skin formation by rotational molding and the subsequent dispersion of pellets cannot proceed smoothly. In contrast, although the thickness can be greater than 100 mm, it is preferable for the case that a shaped body with a thickness beyond the value to provide a hollow portion of approximately the same figure as the shaped body in the center of the core, as described below. There are also no particular restrictions on the thickness of a foam composite, although ensuring the thickness to be 25 mm or above, preferably 40 mm or above, is effective for the sandwich structure thereof to exhibit its advantages, enabling a lightweight structural member with excellent flexural strength to be obtained.

A foam composite of the present invention can be used as a cushioning material, and the cushioning characteristics can be improved by making the foamed body to have two layers by foaming the skin. Strong-kneed cushioning materials can be obtained by applying a reinforcing member. If the expansion ratio of a foamed core is controlled to be 10-fold or greater, and that of a skin 5-fold, the product is preferably used for a cushioning material, an impact absorber, or a flotation material. According to this technique, it is possible to make a foam composite, for example, having structure, as shown in FIG. 1, composed of a foamed core layer of 30-fold expansion, and of a foamed skin layer, above the core layer, of 7-fold expansion, and a foam composite having reinforcing members, and further, a foam composite having a non-foamed thin skin, all of which can serve as a bed by covering simply with a sheet, and can be readily washed and disinfected, and consequently serve as a infection preventing hospital bed.

Figure 5:
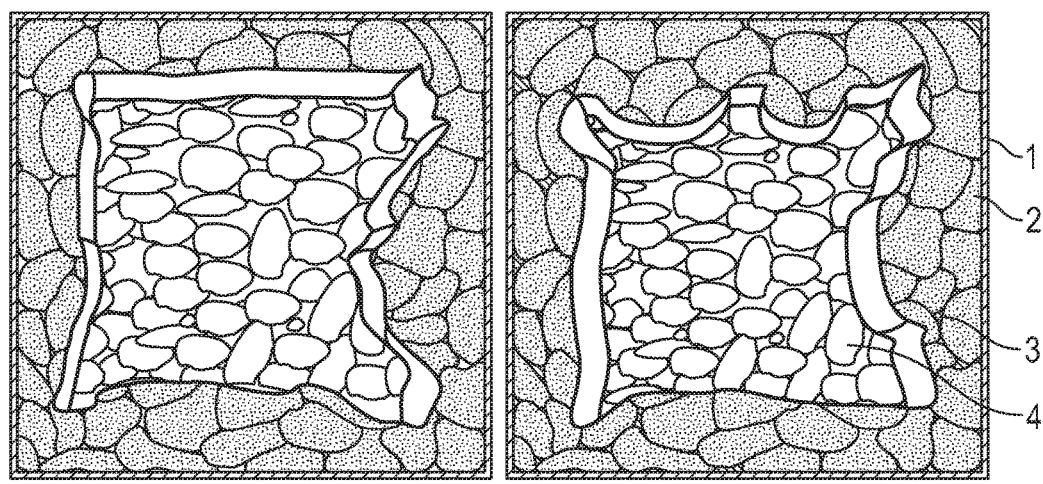
FIG. 5 illustrates an example of a shaped hollow body comprising a skin and a foamed body with reinforcing members. In the figure, 1 is a skin, 2 a foamed body of high degree expansion, 3 reinforcing members, and 4 a hollow section.

In the present invention, although a sandwich-structure body can be made, a composite with a hollow section having a figure similar to the shaped body in the center, can also be made as shown in FIG. 5. A shaped body having such structure is excellent in elastic properties, lightweight, and inexpensive, therefore, favorable for cushioning materials and flotation materials. For example, a shaped hollow body with non-foamed or slightly foamed reinforcing members, wherein the thickness of the foamed layer is controlled within a range from 10 to 100 mm, has not far different compression strength from that of a shaped body filled with a substance in the core section, and the volume fraction of the hollow section can be set to 50% or greater, which enables the production of a large shaped body such as floating pier to be possible. Furthermore, by utilizing a plastic bag having plastic powders inside, and by conducting rotational molding, an inner skin in the hollow section can also be provided.

Applying a process of the present invention, a seat for vehicles comprised of a large-sized rectangular body with a soft skin, or a large-sized rectangular body with a hollow section, can also be produced.

A foam composite with reinforcing members, obtained by a process of the present invention, is lightweight, strong, and is excellent in impact resistance and impact absorption properties, having large compression strength and flexural strength, consequently being an ideal material for structural members. In particular, cushioning materials, flooring materials, wall materials, roofing materials, flotation materials, and impact absorption materials are favorable uses. Further, hitting the material at a person will not injure, permitting fatal accidents to be reduced by the application thereof for upholstery of vehicles. If metal fittings are inserted into the foam composite, tight fixing can be made. Therefore, this technique can be widely utilized for whole uses having desire to be lightweight and strong. For example, if a boat with an apparent specific gravity of approximately 0.2 g/cm$^3$ is molded using the present invention, and then a motor and a screw are equipped with, a durable motorboat can be obtained that will not sink even if it turns over, and will not cause injury even if it hits persons. If a floating board is used instead of a hull, a floating board for lifesaving equipped with a motor can be obtained. Furthermore, this foam composite can be made an improvement in the compression strength to the same level as that of paper honeycomb composites, consequently can be used as a filler material for aircraft wings, mega-floats and the like, to which impact resistance and water resistance, that are disadvantages of the paper honeycomb, are required, wherein the impact resistance can be improved by bonding and integrating thereof by heat or with an adhesive to the surface metal. This foam composite can deform without breaking, and the characteristic is favorable for the use thereof to fuel tanks of automobiles, and contributing to prevent the leak of gasoline and fires. If it is used for the interior of aircrafts or of the Shinkansen cars, fatal accidents caused by a collision can be suppressed, and injuries caused by a fall will be avoided by using it for stairways.

Figure 7:
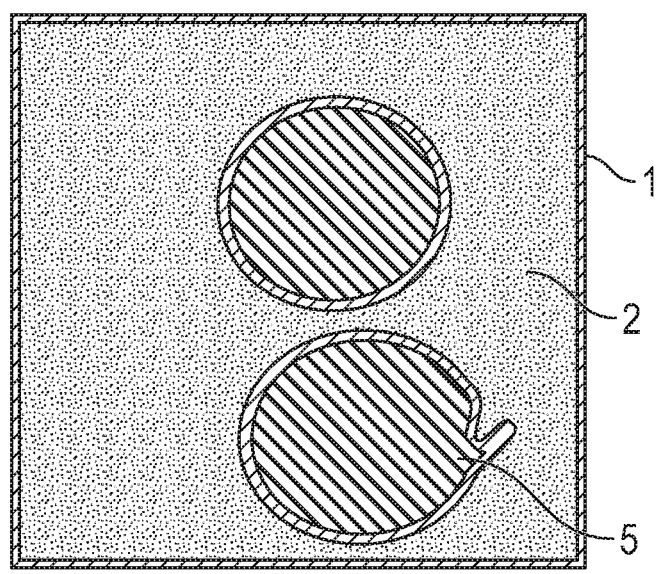
FIG. 7 illustrates an example of a shaped body, comprising a skin, a core, and inserted waste. In the figure, 1 is a skin, 2 a foamed-body core of high degree expansion, 5 rubber and plastic waste (i.e. old golf balls).
Figure 8:
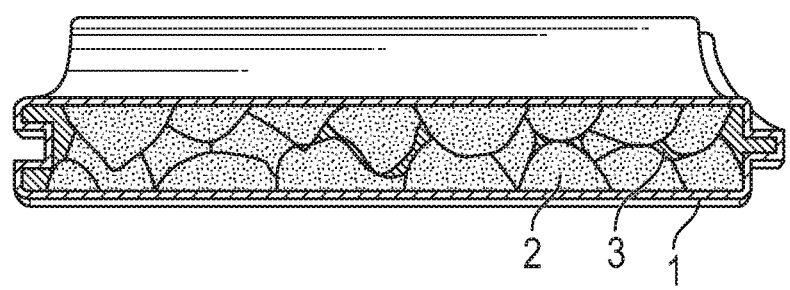
FIG. 8 illustrates an example of a shaped body that can be joined together, wherein a foam composite with a skin and reinforcing members, is provided with a concave and a convex section. In the figure, 1 is a skin, 2 a foamed body of high degree expansion, 3 reinforcing members, and 7 a convex section.
Figure 9:
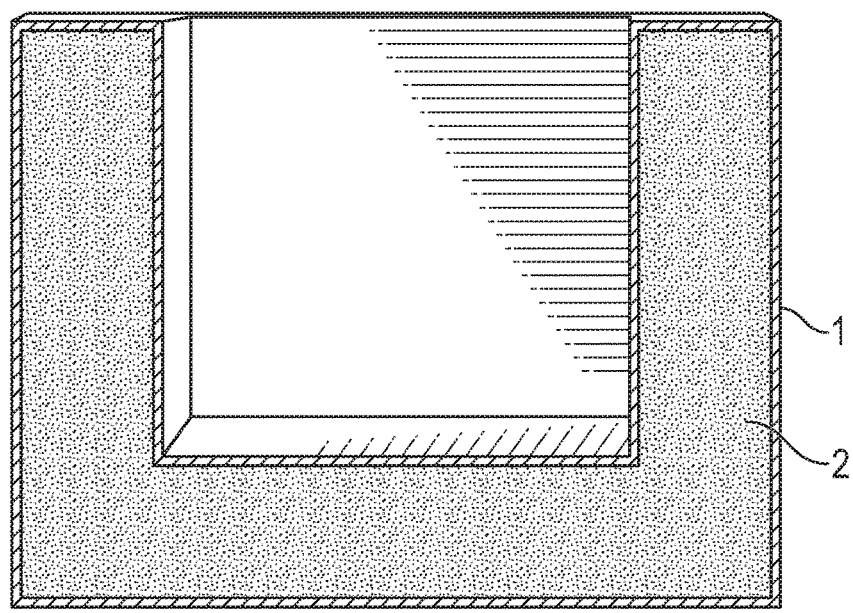
FIG. 9 illustrates an example of an insulated container comprising a skin and a core. In the figure, 1 is a skin, and 2 a foamed body of high degree expansion.

Using this technique, as shown in FIG. 7, plastic waste materials, for example, particles of crushed waste materials from the foam composite produced by the present invention, can be used for the production of a shaped body by inserting thereof in the central section of the foamed core. Using this technique, waste materials of rubber, FRP and the like, which are difficult to utilize using other techniques, can be inserted similarly. If these waste materials are crushed to form particles that are either the same size as, or larger than, the polyolefin pellets that can be cross-linked and foamed, and then added in quantities that amount to between 30 and 70% of the entire product quantity, the increase of the product in the compression strength can be achieved, which enables its practical use for a thick board or column possible. Mud or sand can be mixed with materials of this technique, provided the quantity thereof is not large, and the influence accompanied on the molding is little. Pellets that can be cross-linked and foamed may contain small quantities of pellets that show poor foaming properties, and the influence accompanied on the core forming is not significant. Further, recycled materials can be utilized for the forming, while a skin of a new material can be formed on the surface. As these examples indicate, the foam composite of the present invention is not only recyclable itself, but also enabling the use of other waste as a material. If a foam composite containing reinforcing members is produced with a recycled material, for example, and the foam composite is used as a substitute material for wood, it contributes to the effective use of natural resources and to the cleanup of environment. This technique must be the only one for the production of lightweight substitute materials for wood.

In the present invention, a flame retardant shaped body can be produced by using flame retardant plastic as a material for the skin, foamed core, and reinforcing members, or by adding a flame retardant to the material. In this technique, a plastic film, a metal foil or the like can be adhered to the surface of a shaped body, by adhering the above material to the inside surface of the mold prior to molding.

Figure 6:
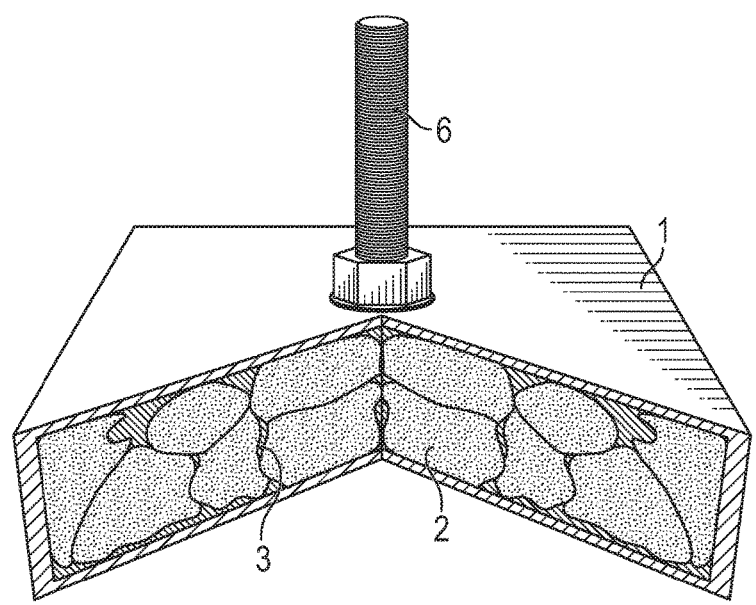
FIG. 6 illustrates an example of a shaped body, comprising a skin, a foamed-body core with reinforcing members, and inserted metal parts. In the figure, 1 is a skin, 2 a foamed body of high degree expansion, 3 reinforcing members, and 6 metal parts.

If a foam composite with metal fittings such as bolts, nuts, pipes or the like, embedded in the composite, is formed by this technique, strong skins can be formed on the surface of metal fittings, as shown in FIG. 6, making the bonding of the fittings to the shaped body extremely strong. As a result, the shaped body can be connected firmly together with another shaped body or with other structural bodies. In this case, if the core has reinforcing members, it is preferable because metal fittings can be strongly grasped.

By providing a convex section in one shaped body of the present invention, and a concave section in another body, the two bodies can be joined together, and can be used for carrier boxes and the like. Further, by providing concave sections in two shaped bodies, and using a connection part of wood or the like wherein the volume of the part is two times as large as the concave section, the two bodies can also be joined together. Not like a convex section, concave sections are not obstructive. If wood parts are used, firm connection effect is generated by the moisture absorption of wood. Because a shaped body formed by the present invention has good dimensional precision, elasticity, and the skin thereof is durable and smooth, the shaped body can be firmly connected with almost no occurrence of the disconnection, and further, the connecting section shows excellent gas tightness. By providing a low-expansion foamed body as a skin, the gas tightness can be improved further, and a leakage of water can be suppressed. By providing a taper on the convex and concave sections, they can engage each other more smoothly and compactly. Further, a metal member can be attached at a corner or an edge section of the connected shaped bodies for the protection thereof, moreover, an external frame or the like can be equipped to prevent the whole shaped bodies from separating. For example, using this technique, pillars of the size 100×100×2000 mm having four concave sections of the size 20×20×20 mm on both end surfaces thereof and each four sides close to the ends, namely in a total of 10 locations, are made, and then a cubic body can be formed by joining twelve of these pillars together with wooden joint members of the size 20×20×40 mm. Thus assembled body has eight concave sections of the size 20×20×20 mm on each six surfaces thereof. If panels of the size 2000×2000×50 mm having eight concave sections are prepared, and these panels are joined to the assembled pillars, then a durable room of the size 2000×2000×2000 mm can be obtained, and, if windows and doors are fixed to the room, a cheap house and, for example, a refugee reception house can be produced. A row house with 2 or 3 separate apartments can be installed by connecting the above-mentioned houses. Furthermore, this kind of connectable pillar or panel can also be used for stage properties and the like.

If long cylindrical bodies (including semicircular cylindrical bodies), each having a male screw fitting at one end and a female screw fitting at the other end, are made by this technique, these have excellent strength, elasticity, weather resistance, and watertight properties, and can be readily connected together at the actual spot, therefore, these can be used as heat insulating pipes, allowing the reduction in thickness of the skin at the joint section and the improvement in the insulating properties. Further, these can be used as ducts, if flame retardancy is imparted or metal covers are provided.

Long semicircular cylindrical bodies of a foam composite with reinforcing members can be produced using the present invention, which have a concave and a convex section at the two ends thereof and can be connected together, and by attaching a weight to them, making the middle line of the curve section thereof to reach to the sea level, and then by connecting the above-mentioned bodies together so that the inside of the curve section facing out at sea, they can be used as an oil fence, enabling gathered heavy oil to be recovered readily.

By arranging foam composite panels of the present invention into a box shape, placing at the outside thereof a frame formed from metal angles or the like, and then, by applying pressure to the contact section of the panels, using bolts attached to the frame, water leakage can be suppressed. Preventing water leakage by making the skin of the panel foamed to low expansion, by inserting rods or pipes into the panel, or by using caulking and the like, the above-mentioned product can be used as an insulated chamber, a plating tank, or an insulated pool. Furthermore, if a steel box is installed inside a box made by this technique, then the compression strength thereof can be improved, and the product preferably can be either buried in the ground for use as a cable joint box, or used as a floating pier.

A large drum produced using a foam composite with reinforcing members of the present invention is durable against impact and will not break even if it deforms greatly, therefore, if a metal drum containing vitrified radioactive waste is inserted in that drum, a thick layer of polybutene or the like, which is not fluid at room temperature but becomes fluid at high temperature, is formed between the two drums, and the drums are covered, then the whole becomes impervious to water, and can be stored underwater or in the ground. In this case, the method of storage in the ground can be mostly safe.

If a shaped body with fittings such as bolts or nuts embedded in the center is formed with a foam composite with reinforcing members of the present invention, the body can be readily secured to other objects. A chair comprising a seat, armrests, and a back support, can be produced by this integrated molding method, and then be attached inside an aircraft or a car of the Shinkansen and the like, making reduction in the danger of physical injury in the case of a collision accident. Furthermore, if a tabletop with embedded fittings is formed, and then legs are attached with the fittings, lightweight furniture for an aged or physically handicapped person or an infant can be produced.

Steel pipes treated of rust preventive means are generally used in a construction a part of which is placed in the sea. These pipes are prone to rust within those sections that, due to the tide, are repeatedly dried and rewet, and are frequently damaged in the above-mentioned sections by ships. If semicircular cylindrical bodies that can be joined together are produced from a foam composite with reinforcing members, of this invention, and then used to cover these steel pipes preventing from entering the seawater, it will not break even if a ship hits this cover, consequently, prevention of corrosion and a long lifespan of the pipes can be secured.

By this technique, a composite comprised of a skin and a foamed core can be produced inexpensively in one shot, and if a greatly foamed body of 30-fold expansion is made as a core, a foamed body of low expansion in the range of spherical foam having a thickness not less than 2 mm is made as a skin, so that moisture absorption is suppressed by the skin, an excellent insulating material having heat insulating properties being durable for many years of use can be obtained, consequently, contributing to the energy conservation and to the prevention of global warming.

Furthermore, a shaped body having a core with reinforcing members can be made by this technique, and with only ¼ the apparent specific gravity of wood, for example, the body can achieve an equivalent strength or rigidity to wood, therefore, be applicable to wall materials, floor materials, ceiling materials, pallets, molding frames for construction uses, suspension bridges, and floating piers and the like. Moreover, an elastic body obtained by foaming the skin, is lightweight, durable, and when subjected to impact, undergoes deformation without breaking, therefore, can be used as a cushioning material, an impact absorption material and a flotation material. In addition, this technique is an advanced technology that enables the use of recycled plastic to produce articles of wood substitute materials, and that enables the reduction in construction cost by applying a prefabrication system.

EXAMPLES

The present invention is further described by the following examples, however, such examples are not to be construed as limiting in any way the scope of the present invention.

Example 1

58 g of HDPE powder (i.e. a main peak of the particle size distribution at 0.1 mm) with a density of 0.96 g/cm$^3$ and a melt property of $1 \times 10^4$ Pa, characterized by storage elastic modulus measured at 190° C. and at the angular velocity 1 rad/s, and 10 g of pellets, formed by mixing 0.1, 0.3, 0.5, 0.7, or 0.9 PHR of dicumyl peroxide with LDPE having a density of 0.92 g/cm$^3$ and a MFR of 1.5 g/10 min, and by mixing to each mixtures 20 PHR of azodicarbonamide and 0.5 PHR of trimethylolpropane triacrylate and kneading, and then conducting processing to form pellets having the length of a side 4 mm, were charged in a steel mold with internal dimensions of 100×100×25 mm and a wall thickness of 4 mm. The mold was then mounted to an electrically heated swinging-rotating type molding apparatus, foaming was conducted applying a main rotational speed of 10 rpm and a secondary rotational speed of 5 rpm, and heating at the ambient temperature inside of the apparatus of 230° C. for 25 min, and following the cooling of the mold in water, and then removing a shaped body from the mold. Test results with thus obtained foam composites are shown in Table 1.

As is evident from Table 1, the shaped body of 0.1 PHR dicumyl peroxide mixing did not foam well, while that of 0.9 PHR suffered from the generation of numerous voids and large irregularities in the skin. Shaped bodies of 0.3 or 0.7 PHR dicumyl peroxide had evenly and finely foamed bubbles, a core with almost no boundary of particles being adhered to a skin, and the skin being even and of 2 mm thickness. Further, the foamed bodies thereof had gel fractions within a range from 38 to 70%, and storage elastic moduli within a range from 2.1 to 2.6×10 Pa$^4$.

TABLE 1

| Quantity of dicumyl peroxide (PHR) | Density of core (g/cm³) | Core | Storage elastic modulus (10 Pa⁴) | Gel fraction of foamed body (%) |
|---|---|---|---|---|
| 0.1 | No foaming | | 1.6 | 0 |
| 0.3 | 0.05 | Fine, no boundary | 2.1 | 38 |
| 0.5 | 0.05 | Fine, no boundary | 2.6 | 60 |
| 0.7 | 0.055 | Fine, no boundary | 2.6 | 70 |
| 0.9 | 0.06 | Voids | 2.9 | 75 |

Example 2

0.5 PHR of Perkadox™ (i.e. bis-(4-t-butylcyclohexyl) peroxidicarbonate) and 20 PHR of ADCA (i.e. azodicarbonamide) were mixed with LDPE with a MFR of 1.5 g/10 min., and the mixture was shaped into a rod of 4 mm in diameter, and then the rod was provided with a 2 mm thick covering of HDPE having a MFR of 3.0 g/10 min., compressed and cut in the molten state into 8 mm long, consequently double-layered pellets, whole surfaces of which were covered with the plastic layer, were obtained. The minimum thickness of the joined section was 0.6 mm. The double-layered pellets were charged in four molds with internal dimensions of 100×100×25 mm, together with 58 g of HDPE powders having a MFR of 1 g/10 min., while the quantity of the double-layered pellets was varied between 17.7, 14.3, 12.1, and 9.6 g for each mold, and then molding of a foam composite was conducted using a main rotational speed of 10 rpm, a secondary rotational speed of 5 rpm, and a heating at 230 for 30 minutes, and following cooling in water.

Figure 12:
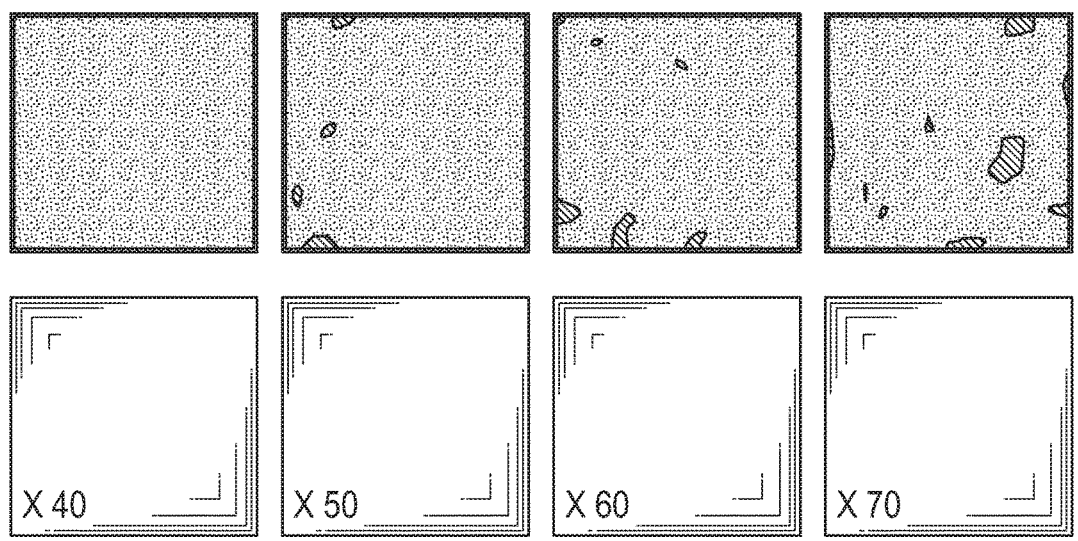
FIG. 12 illustrates an example of a shaped body consisting of a foam composite with a skin and a core, wherein a foamed body is adjusted in a range from 40 to 70 times.
Figure 13:
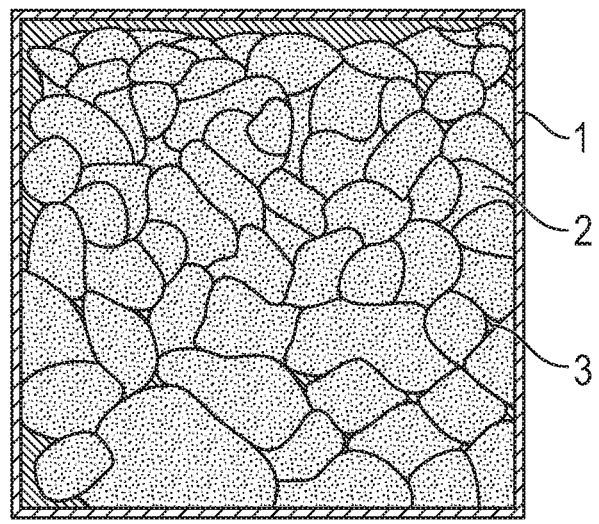
FIG. 13 illustrates an example of a shaped body consisting of a foamed skin and a reinforced foamed-body. In the figure, 1 is a skin, 2 a foamed body of high expansion, and 3 a reinforcing member.
Figure 14:
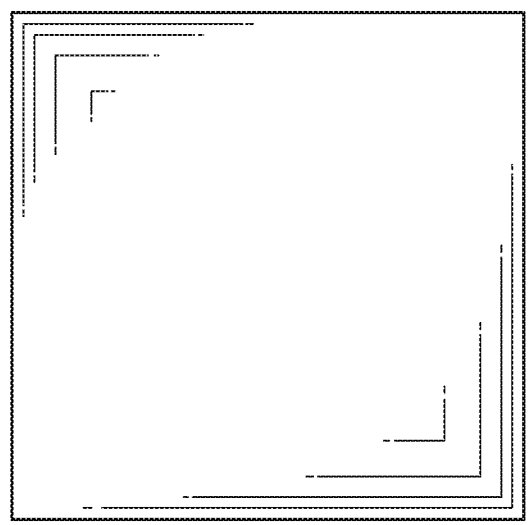
FIG. 14 illustrates an example of a flame retardant foam composite.

FIG. 12 shows cross-sectional photographs of thus obtained foam composites. They have a skin with an even thickness and foamed bodies of uniform sizes, which are covered with reinforcing members, and the skin and the foamed bodies are being integrated together. Expansion ratios of these foamed bodies are, in order from the left, 40-fold, 50-fold, 60-fold, and 70-fold. If foaming is conducted in the above-mentioned state, the escape of gases and the shrinkage are suppressed, therefore, a highly expanded foamed body can be obtained. FIG. 2 shows a cross-section of 40-fold expanded foam composite, and the diameter of the foamed body is approximately flat 15 mm, the thickness of reinforcing members is approximately 0.15 mm, and all the members are connected together, which means that this foam composite has almost ideal reinforcing members.

Example 3

Figure 3:
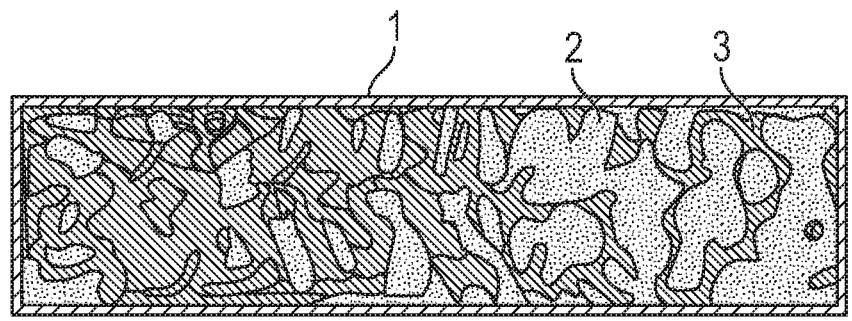
FIG. 3 illustrates an example of a shaped body comprising a skin, a foamed body, and a string-shaped reinforced body. In the figure, 1 is a skin, 2 a foamed body of high degree expansion, and 3 reinforced members.

Using HDPE powders with a MFR of 1 g/10 min., and the same 4 mm long rod as that shaped in the example 2, but the rod was provided with a 2 mm thick covering of LDPE having a MFR of 1.5 g/10 min., and was cut into 8 mm long, and thus obtained double-layered pellets were charged in a mold with internal dimensions of 100×100×25 mm, and then molding of a foam composite was conducted using a main rotational speed of 10 rpm and a secondary rotational speed of 5 rpm, and a heating to foam at 230° C. for 30 minutes, and following cooling in water for 30 minutes. Thus obtained foamed body was like that in FIG. 3, having a skin with an even thickness, low-density foamed bodies, and belt-, string-shape, or solid reinforcing bodies in a mingled state. The half part to the left of the foam has been removed for convenience to observe the shape of reinforcing members, as is the photograph of the foam composite in FIG. 3, and it was clarified that the reinforcing members make an aggregate of belt-, string-, and solid shapes.

Example 4

Figure 11:
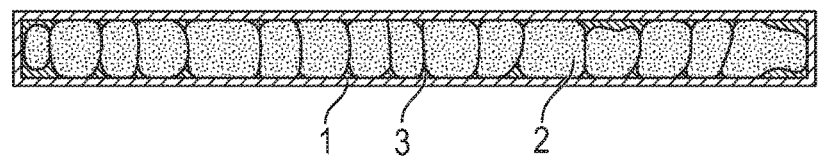
FIG. 11 illustrates an example of a foam composite having a right-angled reinforcement on the skin. In the figure, 1 is a skin, 2 a foamed body of high degree expansion, and 3 reinforcing members.

92 g of the same HDPE powders and 62 g of the same pellets as the example 2 were charged in a mold of the dimension 200×200×15 mm, and heated at 230° C. for 30 minutes while the mold was rotated, and then cooled for 30 minutes in water. As is shown in FIG. 11, thus obtained foam composite had a skin with an even thickness, a core formed in line by the expansion of double-layered pellets, and reinforcing members being vertical to the upper and lower sides. When, in the manner described above, a molding is conducted with double-layered pellets and a thin mold, reinforcing members are formed to the direction of thickness being vertical to a skin, consequently a foam composite having a large compression strength can be obtained.

Example 5

Using a mold of a dimension 200×200×50 mm, foam composites comprising a skin, having a thickness of 1, 2, or 3 mm, and a foamed core of 20-fold expanded LDPE, were formed. For comparison, similar size test specimens of commercially available 50-fold expanded polystyrene foam, and commercially available 30-fold expanded cross-linked polyethylene foam, are also prepared. The test specimens were placed in water at room temperature, and the quantity of water absorption was measured. These results, as shown in Table 2, revealed that the foam composite in which the average thickness of the skin was 1 mm did absorb some water, however, the shaped body with the 2 mm or 3 mm skin absorbed absolutely no water. In comparison, the polystyrene foam and the cross-linked polyethylene foam, which have no skin, both showed significant water absorption. Like these results, foam composites with a skin, having a thickness not less than 2 mm, absorb absolutely no water, therefore, can be used in water.

In addition, the quantity of water absorption of the polystyrene foam, which is comprised of not-integrated foamed body particles, was greater than that of the integrated polyethylene foam.

TABLE 2

| Product name | Average thickness of skin mm | Minimum thickness of skin mm | Quantity of water absorption (weight %) | | | | |
|---|---|---|---|---|---|---|---|
| | | | 0 day | 7 days | 14 days | 30 days | 60 days |
| Foam composite of the present invention | 1 | 0.3 | 0 | 1.7 | 4.4 | 8.7 | 14.0 |

TABLE 2-continued

| Product name | Average thickness of skin mm | Minimum thickness of skin mm | Quantity of water absorption (weight %) | | | | |
|---|---|---|---|---|---|---|---|
| | | | 0 day | 7 days | 14 days | 30 days | 60 days |
| Foam composite of the present invention | 2 | 1.0 | 0 | 0 | 0 | 0 | 0 |
| Foam composite of the present invention | 3 | 1.5 | 0 | 0 | 0 | 0 | 0 |
| Polystyrene foam | no skin | no skin | 0 | 29.6 | 90.7 | 112.0 | 118.1 |
| Cross-linked polyethylene foam | no skin | no skin | 0 | 2.1 | 10.3 | 12.2 | 14.5 |

Example 6

Foam composites A that were 270×300×30 mm foam composite boards with reinforcing members, with one concave section of width 10 mm, depth 10 mm and length 200 mm provided in one of the 270×300 mm surfaces, and in the upper and lower middle of 10 mm distance from one 270 mm side of the surface, and a total of three convex sections capable of mating with the concave section provided in the middle of the 270×30 mm surface and both the 300×30 mm surfaces respectively, were produced. Furthermore, foam composites B that were 330×330×30 mm boards, with four concave sections of the same shape as that in the foam composite A provided in one of the 330×330 mm surfaces, and in the position 10 mm distant from all sides of the board, were also produced. When four of the foam composites A and two of the foam composites B were assembled using the concave and convex sections, an extremely durable, excellent in heat insulating properties and air tightness, waterproof, and sealed container, which can be readily assembled and dismantled having an internal capacity of 270×270×270 mm was formed. Furthermore, if metal fixing members, for example, are attached to the edge sections of the container, the boards can be fixed together, and if large boards are used for the upper and lower sides, to which holes for bolts are provided, the upper and lower boards can be fixed.

Example 7

A foam composite board-shape body, with 300×500×30 mm boards (i.e. side member) connected to the four sides of a square board (i.e. bottom) of a 300 mm side and of 30 mm thick, which is provided with reinforcing members, having narrow and deep grooves, namely 5 mm wide and 27 mm deep, in the section that the square board and the rectangular boards are connected together, was made, subsequently a box-shape body was formed by bending the foam composite boards along the grooves. Further, 200×10×10 mm concave sections were provided at four points in the upper face of the side of the box-shape body (i.e. the face in opposition to the side where the rectangular boards and the square board were connected together). A shaped body of 300×300×30 mm board with 200×10×10 mm convex sections along the four sides of the board was formed and mated with the box-shape body, and then a container was obtained. This container could be a readily assembled and dismantled, and returnable heat retaining box of excellent heat retaining properties.

Example 8

A foam composite with dimensions of 2000×1000×20 mm, comprising the skin of EVA and the core of 20-fold expanded cross-linked polyethylene foam, provided with a 1900×900×100 mm hollow in the middle, was formed. When this formed composite was used as a mat, the mat was durable, excellent in cushioning and heat insulating properties, and was able to be slept on by simply putting a sheet on it, and washed with water or disinfected, being suited to a hospital mattress for preventing the spread of infection. Further, by producing a foam composite provided with a core with thin reinforcing members, a mat having elasticity was obtained.

Example 9

HDPE powders, LDPE pellets that can be cross-linked and foamed, and two used golf balls representing plastic waste were charged in a mold with dimensions 100×100×100 mm, and molded by heating the mold at 230° C. for 30 minutes. As shown in FIG. 7, a shaped body with a skin with an even thickness and the golf balls that are fixed in the middle of a foamed core was formed. Like this result, rubber or plastic waste with dimensions greater than the pellets that can be foamed can be readily fixed in the core, and molded without significant decrease in heat insulation properties and strength.

Example 10

Different kinds of insulated containers described below, of dimensions 146×146×146 mm, having faces 40 mm thick, were produced by rotational molding.
1. A double walled container formed solely from a skin of thickness 2 mm.
2. An insulated container with the same skin as 1 and a core of 20-fold expanded LDPE foam
3. An insulated container with a skin of 2-fold expanded LDPE foam and a core of 20-fold expanded LDPE foam.
4. An insulated container with the same skin as 3 and a core comprising 20-fold expanded foam and reinforcing members.

Figure 15:
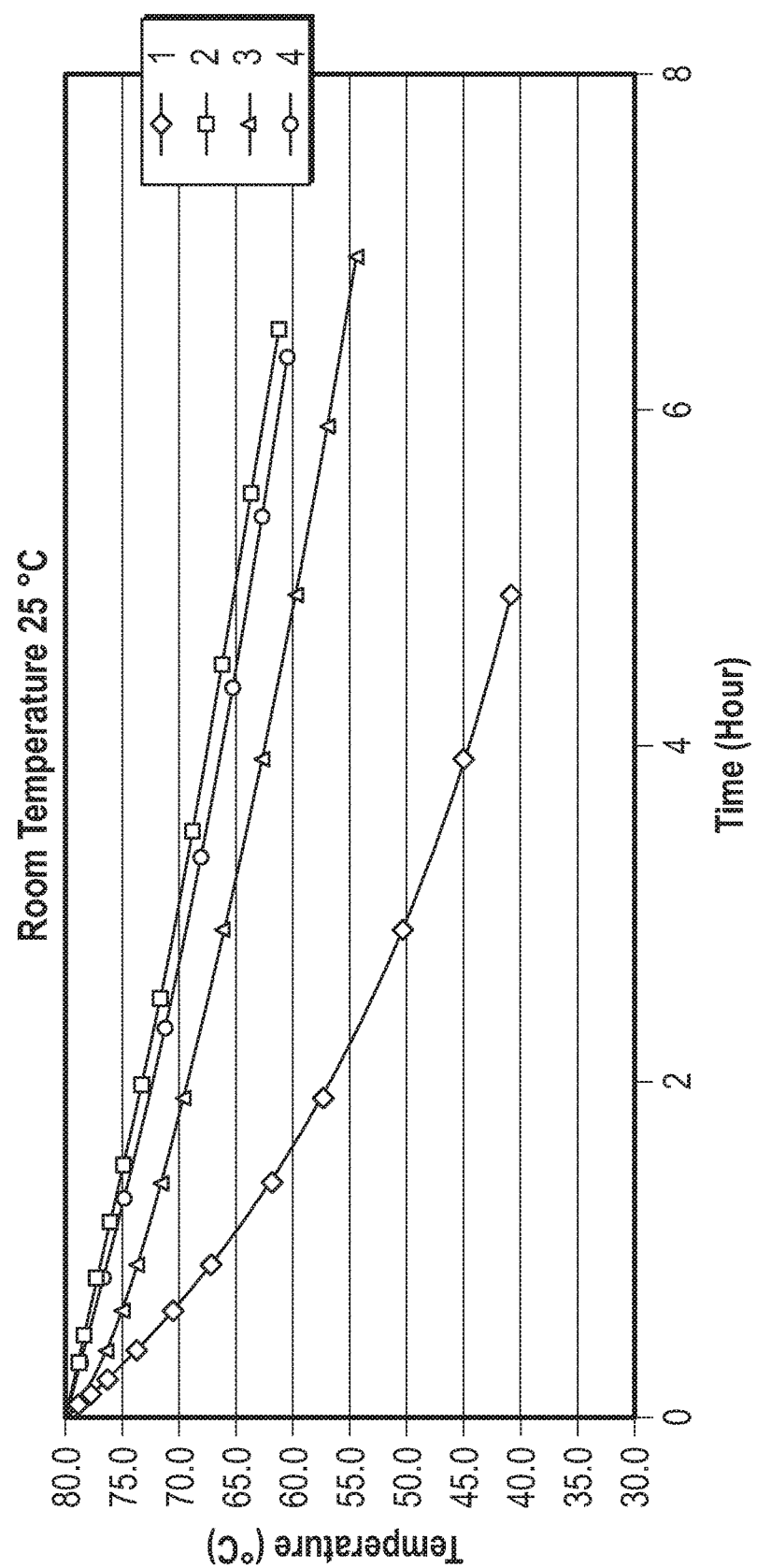
FIG. 15 is a graph, showing the thermal insulation property of a foam-composite vessel.

Apparent specific gravity of the above-mentioned containers was 0.094, 0.139, 0.297 and 0.183, respectively. The containers were filled with hot water of 80° C., and the change in the water temperature was measured at room temperature 25° C., and the results shown in FIG. 15 were obtained. The temperature of the hot water fell most rapidly in the double walled container, while the heat retaining properties of the containers insulated with foam composites were excellent. That of the foam composite with reinforcing members showed slightly reduced heat retention, however, the heat insulating properties could be improved by foaming the reinforcing members, while retaining the strength. Further, variations in the dimensions of the insulated containers were measured during six months, and a slight degree of shrinkage (i.e. 3%) was observed during the first 3 days, after this period, however, no significant shrinkage was observed, indicating that, for practical applications, the shrinkage is not an issue.

Example 11

Using a mold with dimensions 100×100×100 mm, five test specimens described below were formed, removing the side skins, and the compression strength was measured in accordance with the method of JIS K 7208. Compressive breakdown of the specimens did not occur in the measurement, therefore, the yield point (i.e. 5% deformation) was measured for the compression strength.
1. 20-fold expanded LDPE foam.
2. A shaped body comprising 20-fold expanded LDPE with LDPE reinforcing members of 0.15 mm in thickness.
3. A shaped body comprising 20-fold expanded LDPE with HDPE reinforcing members of 0.08 mm in thickness.
4. A shaped body comprising 20-fold expanded LDPE with HDPE reinforcing members of 0.15 mm in thickness.
5. A shaped body comprising 20-fold expanded LDPE to which LDPE is mingled together.

The results of the measurements are shown in Table 3. The test specimens from the shaped body with reinforcing members of 0.15 mm LDPE, 0.08 mm HDPE, or 0.15 mm HDPE, showed extremely increased strength values as approximately 10 times, 3.5 times, or 16.5 times that of the 20-fold expanded LDPE foam, respectively. The shaped body test specimen comprising expanded LDPE to which LDPE is mingled together showed the value of 6.5 times.

TABLE 3

| Shaped body | Compression strength (kg/cm$^2$) | Apparent specific gravity |
| --- | --- | --- |
| 1. 20-fold expanded LDPE foam | 0.2 | 0.050 |
| 2. 0.15 mm LDPE reinforcement to 1 | 2.1 | 0.174 |
| 3. 0.08 mm HDPE reinforcement to 1 | 0.7 | 0.095 |
| 4. 0.15 mm HDPE reinforcement to 1 | 3.3 | 0.174 |
| 5. LDPE mingled together with 1 | 1.3 | 0.174 |

Example 12

A board-like body with dimensions of 255×50×25 mm was formed, and a bending test (i.e. conforming to the methods of JIS K 7203) was conducted using a fulcrum spacing of 200 mm. Failure of the specimens did not occur in the measurement, therefore, the yield point was measured for the flexural modulus.
1. 20-fold expanded LDPE foam.
2. A shaped body of 1 provided with 0.15 mm LDPE reinforcing members.
3. A shaped body of 1 provided with 0.08 mm HDPE reinforcing members.
4. A shaped body of 1 provided with 0.15 mm HDPE reinforcing members.
5. A shaped body comprising 20-fold expanded LDPE to which LDPE is mingled together.

The results of the measurements are shown in Table 4. The reinforcement with 0.15 mm LDPE, 0.08 mm HDPE, or 0.15 mm HDPE, showed a remarkable increase in the flexural modulus, as 4 times, 2.5 times, or approximately 7.5 times that of the LOPE foam, respectively. The shaped body comprising expanded LDPE to which LDPE is mingled together showed the value of 4 times.

TABLE 4

| Shaped body | Flexural modulus (MPa) | Apparent specific gravity |
| --- | --- | --- |
| 1. 20-fold expanded LDPE foam | 20 | 0.050 |
| 2. 0.15 mm LDPE reinforcement to 1 | 80 | 0.174 |
| 3. 0.08 mm HDPE reinforcement to 1 | 50 | 0.095 |
| 4. 0.15 mm HDPE reinforcement to 1 | 150 | 0.174 |
| 5. LDPE mingled together with 1 | 80 | 0.174 |

Example 13

1000 g of LLDPE powders (i.e. UZ3040 of Asahi Kasei Chemicals Corporation) and 5 g of Perkadox™ powders were mixed together and placed in a stainless steel vessel, and then the vessel was covered up, placed in a convection type air oven regulated at 60° C., and was rotated for two hours to conduct mixing of the powders, following the cooling, by which the above-mentioned LLDPE powders with a coating of Perkadox™ on the surface were obtained.

30 g of the powders and 15.5 g of the same pellets as example 2 were charged in a stainless steel square mold with internal dimensions 100×100×25 mm the inside of which a mold-releasing agent had been applied to, and then the mold was mounted to the same electrically heated swinging-rotating type molding apparatus being regulated at 230° C. as example 1, heated under the same condition as example 1, which is followed by the cooling, and then a foam composite was removed from the mold. Thus obtained foam composite had a skin with, notwithstanding its thin thickness of average 1 mm, favorable appearances and the unevenness in thickness not more than ±0.05 mm, and a core with homogeneous and fine bubbles, and of low density with almost no boundary of particles, and the skin being bonded together with the core.

Example 14

1000 g of ethylene-vinyl acetate copolymer resin powders (i.e. K2010 produced by Sumitomo Seika Chemicals Co., Ltd.) and 6 g of Perkadox™ powders were mixed together and placed in a stainless steel vessel, and then the vessel was covered up, placed in a convection type air oven regulated at 60° C., and was rotated for two hours to conduct mixing of the powders, following the cooling, and then the resin powders were covered with a coating of Perkadox™ on the surface. 225 g of thus obtained powders and 50 g of the same pellets as example 2 were charged in a stainless steel square mold with internal dimensions 200×200c25 mm, while the inside of the mold had been applied with a mold-releasing agent, the mold was mounted to the same electrically heated swinging-rotating type molding apparatus as example 1, heated at 165° C. for 40 minutes, heated up further to 205° C., retaining the temperature for 40 minutes following the cooling, then removed a foam composite from the mold. The skin of thus obtained foam composite had an average thickness of 2.25 mm, favorable appearances and acceptable unevenness in thickness.

Because the ethylene-vinyl acetate copolymer resin used for the skin above was a kind of thermoplastic elastomer, the foam composite obtained with this resin had proper cushioning properties, and can be used effectively as materials for safety-related apparatuses.

Example 15

100 g of heat-resistant grade polyamide 12 resin powders (i.e. L1640P produced by Daicel-Degussa Ltd.), 50 g of the LLDPE powders with a covering of Perkadox™, produced in example 13, and 61 g of the same pellets as example 1, were charged in a stainless steel square mold with internal dimensions 200×200×25 mm, the inside of which a mold-releasing agent had been applied, and then the mold was mounted to the same electrically heated swinging-rotating type molding apparatus as example 1, heated at 160° C. for 25 minutes, heated up further to 205° C., retaining the temperature for 25 minutes following the cooling, and then removed a foam composite from the mold. The skin of the foam composite had, notwithstanding its thin thickness of average 1.5 mm, favorable appearances and the unevenness in thickness not more than ±0.05 mm. A foam composite, being possessed of excellent impact strength properties and resistance to chemicals and oil, was thus obtained.

Example 16

200 g of methacrylic acid-alkylester copolymer resin powders (i.e. LP-3106 produced by Mitsubishi Rayon Co., Ltd.) and 140 g of double-layered pellets (i.e. 5.7-fold), were charged in a stainless steel square mold with internal dimensions 200×200×25 mm, the inside of which a mold-releasing agent had been applied, and then the mold was mounted to the same electrically heated swinging-rotating type molding apparatus as example 1, heated at 250° C. for 40 minutes, following the cooling, and then removed a foam composite from the mold. A foam composite with a smooth, transparent and hard skin of the thickness of average 2.0 mm was formed. A container, being possessed of excellent heat insulation properties and favorable appearances, was thus obtained.

Example 17

30 g of polyacetal powders (i.e. Duracon M90-00 CF200P produced by Polyplastics Co., Ltd.) and 30 g of the LLDPE powders with a coating of Perkadox™, produced in example 13, and 50 g of the same pellets as example 1, were charged in a stainless steel square mold with internal dimensions 100×100×25 mm, the inside of which a mold-releasing agent had been applied, and then the mold was mounted to the same electrically heated swinging-rotating type molding apparatus as example 1, heated at 170° C. for 20 minutes, heated up further to 190° C., retaining the temperature for 20 minutes following the cooling, and then removed a foam composite from the mold. A foam composite with a smooth, semi-transparent and hard skin with a thickness of average 2.0 mm was formed. The foam composite could be applied for heat-retaining containers.

Example 18

90 g of epoxy resin powders for powder coating uses (i.e. EY-7 produced by Shinto Paint Co., Ltd.), and 50 g of the same pellets as example 1, were charged in a stainless steel square mold with internal dimensions 100×100×25 mm, the inside of which a mold-releasing agent had been applied, and then the mold was mounted to the same electrically heated swinging-rotating type molding apparatus as example 1, heated at 160° C. for 30 minutes, heated up further to 230° C., retaining the temperature for 20 minutes following the cooling, and then removed a foam composite from the mold. A foam composite with a smooth and hard skin with a thickness of average 2.0 mm was formed. The foam composite could be applied for heat-retaining containers.

Example 19

A cylindrical insulated vessel of a foam composite with internal dimensions of 400 mm in diameter, 500 mm in depth, and 40 mm in thickness was produced. The skin was 2 mm in thickness, while the core was composed of 40-fold expanded foamed bodies of 10 mm in diameter with reinforcing members of 0.1 mm in thickness, being the skin and the core self-supported each other, and the weight ratio of the core to the reinforcing members 3 to 1. When the foam composite vessel filled with hot water of 80° C. was placed in a room of 30° C. room, it required five hours for the temperature fell to 60° C., indicating that the shaped body had an excellent insulating properties and strength.

Example 20

Figure 10:
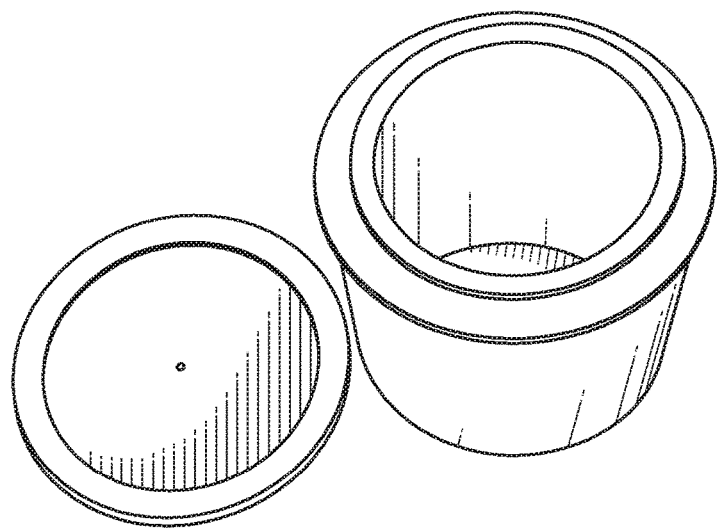
FIG. 10 illustrates an example of an insulated container comprising a skin and a core with reinforcing members.

As a skin material, 60 g compound powders (i.e. a resin with flame retardancy equivalent to V-0 of the UL specification), that were formed by blending ethylene-vinyl acetate copolymer (i.e. EVA) containing a vinyl acetate component of 20% in weight, 120 PHR aluminium hydroxide powders, 25 PHR decabromodiphenyloxide, and 10 PHR antimony hydroxide with a kneader, as a core material, 15 g pellets with a side of 3 mm in length, that were formed with a compound (i.e. a resin with flame retardancy equivalent to V-0 of the UL specification) obtained by blending 25 g HDPE, 25 PHR magnesium hydroxide, 30 PHR aluminium hydroxide powders, 0.5 PHR dicumylperoxide, and 20 PHR diazocarbonamide with a kneader, and 0.05 g DCP were charged in a mold with internal dimensions 100×100×25 mm, and using the same rotational molding apparatus as example 1, the mold was heated at 230° C. for 30 minutes while rotation was applied together. Following the cooling and removing a product from the mold, test specimens as shown with photographs in FIG. 10 were prepared. Thus obtained specimens were tested with the calorimetric test method for evaluating the flammability of building materials, and were in accordance with "Flammability Test" of Article 2, the Building Standards.

INDUSTRIAL APPLICABILITY

As is evident from the description above, by charging plastic powders or minute particles, together with polyolefin pellets, that are larger than the powders or minute particles, and can be cross-linked and foamed, or the polyolefin pellets with a plastic covering, in a mold, and heating the mold while rotating, a foam composite having tightly bonded structure of a skin and a foamed core can be produced in one shot. This shaped body is lightweight and strong, shows excellent heat insulating properties, and suffers almost no reduction in heat insulation through moisture absorption, and can consequently be used as an insulating material over prolonged periods, thereby contributing to the prevention of global warming. Furthermore, a rigid body with an equivalent flexural strength to wood, with only ¼ the apparent specific gravity of wood, and an elastic body that, when subjected to impact, undergoes deformation without breaking and restores its original shape, can be obtained with a composite with reinforcing members in the core, and utilized in all uses that require lightweight properties and strength. In addition, recycled plastic can be used as a material of shaped bodies, and also fixing waste in the middle of a shaped body is possible, enabling wood substitution with expectations for the effective use of natural resources and the like.

The invention claimed is:

1. A double-layered foaming pellet suitable for producing a foam composite having a skin and at least one foamed body covered with reinforcing members which connect to each other in three dimensions, the double-layered foaming pellet comprising:
a rod of polyolefin that is cross-linkable and foamable;
a plastic covering entirely covering the whole surface of the rod of polyolefin;
wherein the double-layered foaming pellet has a shape such that a center is bulged and edges are flattened, when seen from a side;
wherein the double-layered foaming pellet has a length of from 3 to 15 mm;
wherein the center of the rod of polyolefin has a diameter of from 2 to 10 mm; and
wherein the plastic covering, at the center of the rod of polyolefin, has a thickness of from 0.5 to 5 mm, and the plastic covering, at the edges, has a thickness of 0.3 mm or more.

2. A foamed composite being formed from a double-layered foaming pellet having the properties as recited in claim 1, wherein the rod of polyolefin is cross-linkable and foamable, the foamed composite having:
a skin with an even thickness and a core containing a plurality of foamed bodies with homogeneous and fine bubbles and spherical plastic reinforcing members with an even thickness of 0.05 to 0.5 mm covering each of the plurality of foamed bodies, the foamed bodies being of a size from 5 to 25 mm;
the thickness of the skin is within a range from 1 to 10 mm;
a number of the plurality of foamed bodies, which are bonded to each other to constitute the core, wherein each foamed body is formed from a single double-layered foaming pellet;
a number of the plurality of foamed bodies are connected in three dimensions;
the density of the plurality of foamed bodies is from 0.1 to 0.01 g/cm$^3$;
the thickness of the core is from 10 to 100 mm; and
the thickness of the foam composite is 25 mm or more.

3. A double-layered foaming pellet suitable for producing a foam composite having a skin and at least one foamed body covered with reinforcing members which connect to each other in three dimensions, the double-layered foaming pellet comprising:
a rod of polyolefin;
a plastic covering entirely covering the whole surface of the rod of polyolefin;
wherein the double-layered foaming pellet has a shape such that a center is bulged and edges are flattened, when seen from a side;
wherein the double-layered foaming pellet has a length of from 3 to 15 mm;
wherein the center of the rod of polyolefin has a diameter of from 2 to 10 mm;
wherein the plastic covering, at the center of the rod of polyolefin, has a thickness of from 0.5 to 5 mm; and
the edges have a thickness of 0.3 mm or more and are at an acute angle.

4. A foamed composite being formed from a double-layered foaming pellet having the properties as recited in claim 3, wherein the rod polyolefin is cross-linkable and foamable, the foamed composite having:
a skin with an even thickness and a core containing a plurality of foamed bodies with homogeneous and fine bubbles and spherical plastic reinforcing members with an even thickness of 0.05 to 0.5 mm covering each of the plurality of foamed bodies, the foamed bodies being of a size from 5 to 25 mm;
the thickness of the skin is within a range from 1 to 10 mm;
a number of the plurality of foamed bodies, which are bonded to each other to constitute the core, wherein each foamed body is formed from a double-layered foaming pellet;
a number of the plurality of foamed bodies are connected in three dimensions;
the density of the plurality of foamed bodies is from 0.1 to 0.01 g/cm$^3$;
the thickness of the core is from 10 to 100 mm; and
the thickness of the foam composite is 25 mm or more.

* * * * *